(12) United States Patent
Blackwell et al.

(10) Patent No.: US 6,379,407 B1
(45) Date of Patent: Apr. 30, 2002

(54) FILTER ELEMENT WITH DISCRETE HEAT GENERATORS AND METHOD OF MANUFACTURE

(75) Inventors: Bryan E. Blackwell, Franklin; Albert C. McDonald, Jr., Greenwood; Thomas M. Yonushonis, Columbus, all of IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 09/602,257

(22) Filed: Jun. 23, 2000

(51) Int. Cl.⁷ ............................................. B01D 39/00
(52) U.S. Cl. ..................... 55/282.3; 55/521; 55/523; 55/DIG. 10; 55/DIG. 30; 60/303; 60/311
(58) Field of Search ..................... 55/282.2, 282.3, 55/521, 523, DIG. 10, DIG. 30; 60/303, 311

(56) References Cited

U.S. PATENT DOCUMENTS

| | | |
|---|---|---|
| 4,589,983 A | 5/1986 | Wydevan |
| 5,074,112 A | 12/1991 | Walton et al. |
| 5,087,272 A | 2/1992 | Nixdorf |
| 5,180,559 A | 1/1993 | Ma |
| 5,322,984 A | 6/1994 | Habeger, Jr. et al. |
| 5,453,116 A | 9/1995 | Fischer et al. |
| 5,536,477 A | 7/1996 | Cha et al. |
| 5,767,470 A | 6/1998 | Cha |
| 5,853,579 A | 12/1998 | Rummler et al. |
| 5,908,480 A | 6/1999 | Ban et al. |

FOREIGN PATENT DOCUMENTS

| | | | |
|---|---|---|---|
| JP | 3-275110 A | * | 12/1991 |
| JP | 4-279715 A | * | 10/1992 |
| JP | 6-241022 A | * | 8/1994 |

* cited by examiner

Primary Examiner—Robert A. Hopkins
(74) Attorney, Agent, or Firm—Nixon Peabody LLP; Charles M. Leedom, Jr.; Daniel Song

(57) ABSTRACT

A microwave regenerable filter element including a filter media for filtering particulates from an exhaust gas, and a plurality of discrete heat generators disposed in the filter media, each of the plurality of discrete heat generators being adapted to absorb microwave energy and convert the microwave energy into heat. In one embodiment, the plurality of discrete heat generators may have a length dimension of substantially ½ of a microwave wavelength and a width dimension of substantially ⅛ of a microwave wavelength. In another embodiment, the plurality of discrete heat generators may be disposed in a spatial array in a manner that density of the plurality of discrete heat generators varies radially away from a central axis of the filter element. In yet another embodiment, the density of the plurality of discrete heat generators in the spatial array may also vary axially along the central axis of the filter element.

37 Claims, 5 Drawing Sheets

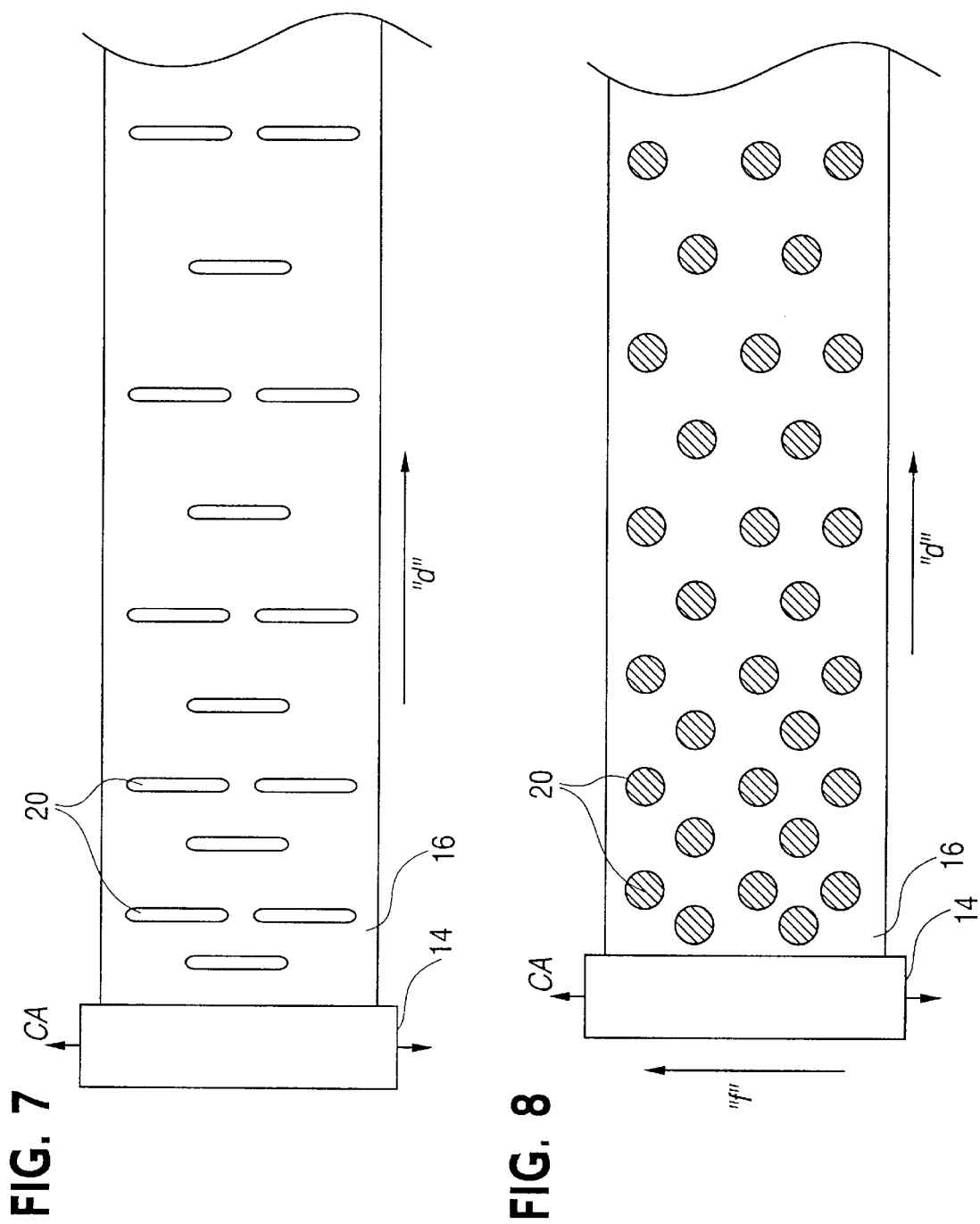

FILTER ELEMENT WITH DISCRETE HEAT GENERATORS AND METHOD OF MANUFACTURE

BACKGROUND OF THE INVENTION

1. Field of the Invention

The present invention is related to the field of filter elements and to methods for manufacturing such filter elements. More specifically, the invention relates to such filter elements that can be regenerated using microwaves.

2. Description of Related Art

Exhaust gases from internal combustion engines and other industrial devices have been found to be detrimental to the environment and are considered to be major contributors to various environmental pollution problems including air pollution. Typically, incomplete combustion of petroleum-based fuels such as diesel fuel, causes emission of carbon containing particulates. Because of the detrimental effect on the environment, exhaust emissions of internal combustion engines and other industrial devices have been subjected to ever increasing scrutiny and regulation by governmental agencies which are mandating reduced particulates and other pollutants from exhaust emissions.

In response, various types of high temperature exhaust filtration devices have been proposed in the art for removing particulates from exhaust gases. In such filtration devices, when the filter element has collected a certain quantity of particulates, the pressure drop across the filtration device becomes excessive. Then, the filter element must be either replaced or regenerated. In this regard, by further increasing the temperature of the filtration element and the particulates, incineration of the particulates collected on the filter element may be attained so that the filtration device and the filter element may be returned into service.

Various regeneration techniques have been developed and applied especially in diesel engine exhaust engine applications. Because diesel particulates do not undergo significant oxidation at normal operating exhaust temperatures of less than approximately 400° C., these regeneration techniques typically seek to increase the temperatures of the particulates to beyond 400° C. to incinerate these particulates. For example, diesel engines' exhaust temperatures can be raised to above 500° C. to induce filter element regeneration by throttling the engine. However, this technique requires operator intervention and the suspension of normal engine operation for a period of time. Because of these disadvantages, throttling has not been widely adopted as a suitable method of filter element regeneration. In other techniques, alternative heat sources such as burners or resistance heaters are used to raise the exhaust temperature and/or filter temperature to regenerate the filter element. However, these techniques have also been shown to have limitations in that they are not very reliable in initiating particulate incineration and can lead to incomplete filter element regeneration. In certain instances, such techniques can even destroy the filter element by causing localized thermal stresses.

To avoid the disadvantages of these filter regeneration techniques, a filter regeneration technique of providing microwave energy to the filter element has been applied recently. For example, U.S. Pat. No. 5,087,272 to Nixdorf discloses a filtration apparatus which may be regenerated by heating a filter element via microwave energy. The reference discloses that the filter element is heated through numerous very small whiskers of discontinuous silicon carbide fibers substantially homogeneously distributed throughout the filter element. Similar to the foregoing, U.S. Pat. No. 5,074,112 to Walton et al. discloses a filter assembly for filtering the exhaust gases of a diesel engine including a mechanism from providing microwaves to regenerate the filter element. In this regard, in a similar manner to the Nixdorf reference, Walton teaches that the filter element is evenly coated with a ferrite susceptor material which absorbs microwave energy and produces the heat required to incinerate the trapped particulates of the filter element.

In application, however, the above noted filter regeneration devices and filter elements as described in Nixdorf and Walton references have been found by the present applicants to be inadequate for fully regenerating the filter elements. In particular, it has been found that such filter elements having a substantially homogenous and evenly distributed whiskers or coating of microwave absorbing materials do not allow even regeneration of the filter element, particularly in the portion of the filter element which are furthest distance from the microwave source. The present inventors believe this uneven heating and regeneration results because most of the microwave energy provided to the filter element is absorbed by the microwave absorbing material closest to the microwave source. Consequently, it is believed that the portion of the filter element furthest from the microwave source does not receive sufficient microwave energy to heat to a temperature which will incinerate the particulates in the central portion of the filter. Regardless of the cause, the filter elements as disclosed in the prior art have been found to be inadequate in providing an optimal filter element which can be effectively and fully regenerated using microwave energy.

Therefore, there exists an unfulfilled need for a filter element that can be regenerated using microwave energy while avoiding the limitations of prior art filter elements. In this regard, there exists an unfulfilled need for such a filter element which will provide even heat generation from the location where microwave energy enters the filter to the furthest regions away from this location. There further exists an unfulfilled need for a method for providing such a filter element in an economical manner.

BRIEF SUMMARY OF THE INVENTION

In view of the foregoing, it is an object of the present invention to provide an improved filter element that can be regenerated using microwave energy.

A second object of the present invention is to provide such a filter element which will provide tailorable heat generation from the microwave energy.

A third object of the present invention is to provide such a filter element which can be designed to provide even heat generation or some heterogeneous heat generation distribution, even at portions of the filter element which are furthest from the microwave source to thereby allow full regeneration of the filter element.

Yet another object of the present invention is to provide a method for manufacturing such a filter element in an efficient and economical manner.

In accordance with preferred embodiments of the present invention, these objects are obtained by an improved microwave regenerable filter element including a filter media for filtering particulates from an exhaust gas, and a plurality of discrete heat generators disposed in the filter media, each of the plurality of discrete heat generators being adapted to absorb microwave energy and convert the microwave energy into heat. In accordance with one embodiment of the present invention, the filter media includes a refractory filter sheet which absorbs substantially less microwave energy than the plurality of discrete heat generators. The filter sheet is preferably spirally wound to form a plurality of wound filter layers and the plurality of discrete heat generators are disposed between the plurality of wound filter layers in a spatial array. The filter media may also include a corrugation sheet which is spirally wound together with the filter sheet to form a plurality of wound corrugation layers disposed between the plurality of wound filter layers. In one embodiment, the filter sheet and the corrugation sheet may be wound around a centrally positioned mandrel. The refractory filter sheet and the corrugation sheet may be made of ceramic fibers. In this regard, the ceramic fibers may be at least one of alumina fibers and alumina silicate fibers and the plurality of discrete heat generators may be provided on the refractory filter sheet and/or the corrugation sheet by at least one of laminating, embedding and printing.

In accordance with another embodiment of the present invention, the filter media of the filter element may be a monolithic refractory filter made of a ceramic fiber which is substantially transparent to microwave energy and include a plurality of discrete heat generators disposed in the monolithic refractory filter. The ceramic fiber may be at least one of alumina and alumina silicate and the plurality of discrete heat generators are preferably disposed in the monolithic filter material in a spatial array.

In accordance with one embodiment of the present invention, the plurality of discrete heat generators may be substantially planar shaped having a length dimension and a width dimension which are substantially larger than a thickness dimension. The plurality of discrete heat generators may be shaped as at least one of a polygon, a circle and an ellipse. In this regard, each of the plurality of discrete heat generators may have a length dimension of substantially ½ of a microwave wavelength such as approximately 6.1 centimeters. In addition, each of said plurality of discrete heat generators may have a width dimension of substantially ⅛ of a microwave wavelength such as approximately 1.5 centimeters. Each of the plurality of discrete heat generators may also be made of a plurality of microwave absorption fibers attached together to form each of the plurality of discrete heat generators.

In accordance with yet another embodiment of the present invention, the plurality of discrete heat generators may be disposed in a spatial array in a manner that density of the plurality of discrete heat generators varies radially away from a central axis of the filter element. In particular, the density of the plurality of discrete heat generators in the spatial array may be increased radially away from the central axis of the filter element. Alternatively, the density of the plurality of discrete heat generators in the spatial array may be decreased radially away from the central axis of the filter element. Moreover, in accordance with another embodiment, the density of the plurality of discrete heat generators in the spatial array may vary axially along the central axis of the filter element.

In accordance with another aspect of the present invention, these objects are obtained by an improved method of manufacturing a microwave regenerable filter element including the steps of providing a filter media for filtering particulates from an exhaust gas, and providing a plurality of discrete heat generators disposed in the filter media in a spatial array, each of the plurality of discrete heat generators being adapted to absorb microwave energy and convert the microwave energy into heat.

In one embodiment of the present invention, the present method may further include the step of spirally winding a filter sheet to form the filter media having a plurality of wound filter layers. In addition, the present method may further include the step of spirally winding a corrugation sheet together with the filter sheet to form a plurality of wound corrugation layers disposed between the plurality of wound filter layers. In accordance with the present invention, the step of providing the plurality of discrete heat generators may be attained by at least one of laminating, embedding and printing the plurality of discrete heat generators on the filter sheet and/or corrugation sheet.

In another embodiment of the present invention, the present method may also include the step of providing each of the plurality of discrete heat generators in a predetermined manner such that density of the plurality of discrete heat generators in the spatial array varies radially away from a central axis of the filter element. In this regard, each of the plurality of discrete heat generators may be provided in a predetermined manner such that density of the plurality of discrete heat generators in the spatial array increases radially away from the central axis of the filter element. Alternatively, each of the plurality of discrete heat generators may be provided in a predetermined manner such that the density of the plurality of discrete heat generators in the spatial array decreases radially away from the central axis of the filter element. Moreover, each of the plurality of discrete heat generators may be provided in a predetermined manner such that the density of the plurality of discrete heat generators in the spatial array also varies axially along the central axis of the filter element.

These and other objects, features and advantages of the present invention will become more apparent from the following detailed description of the preferred embodiments of the invention when viewed in conjunction with the accompanying drawings.

BRIEF DESCRIPTION OF THE DRAWINGS

FIG. 7 is a topographical view of a filter sheet in accordance with another embodiment of the present invention where the density of the plurality of discrete heat generators varies.

FIG. 8 is a topographical view of a filter sheet in accordance with yet another embodiment of the present invention where the density of the plurality of discrete heat generators varies.

DETAILED DESCRIPTION OF THE INVENTION

Figure 1:
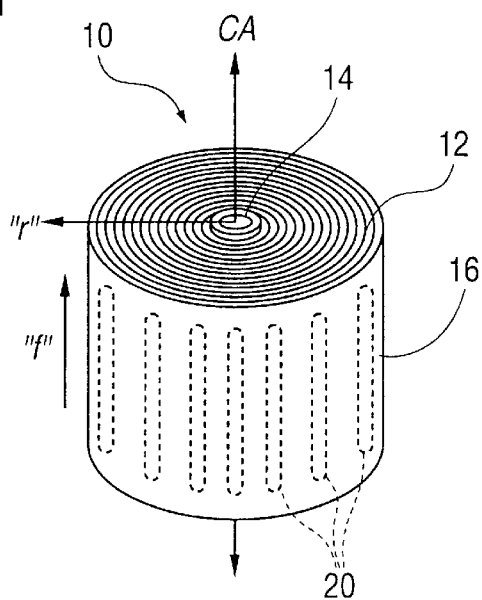
FIG. 1 is a perspective view of a filter element in accordance with one embodiment of the present invention.

FIG. 1 illustrates an improved microwave regenerable filter element 10 in its assembled form in accordance with one embodiment of the present invention which can be regenerated using microwave energy while avoiding the limitations of prior art filter elements. As will be discussed below, the filter element 10 will allow even heat generation from the microwave energy, even at the portions of the filter element which is furthest from the microwave source, to thereby allow fill regeneration of the filter element 10. Moreover, as will also be discussed below, such a filter element 10 may be manufactured in a very economical manner by the method in accordance with the present invention.

As can be seen in the embodiment of FIG. 1, the filter element 10 includes a filter media 12 for filtering particulates from an exhaust gas. The filter media 12 includes a refractory filter sheet 16 which in the illustrated embodiment, is spirally wound around a centrally positioned mandrel 14 to form a plurality of wound filter layers. In addition, as most clearly seen in FIG. 2 which shows a partial assembled view of the filter element 10, the filter media 12 also includes a corrugation sheet 18 which is spirally wound around the mandrel 14 together with the filter sheet 16 to form a plurality of wound corrugation layers disposed between the plurality of wound filter layers.

Figure 3:
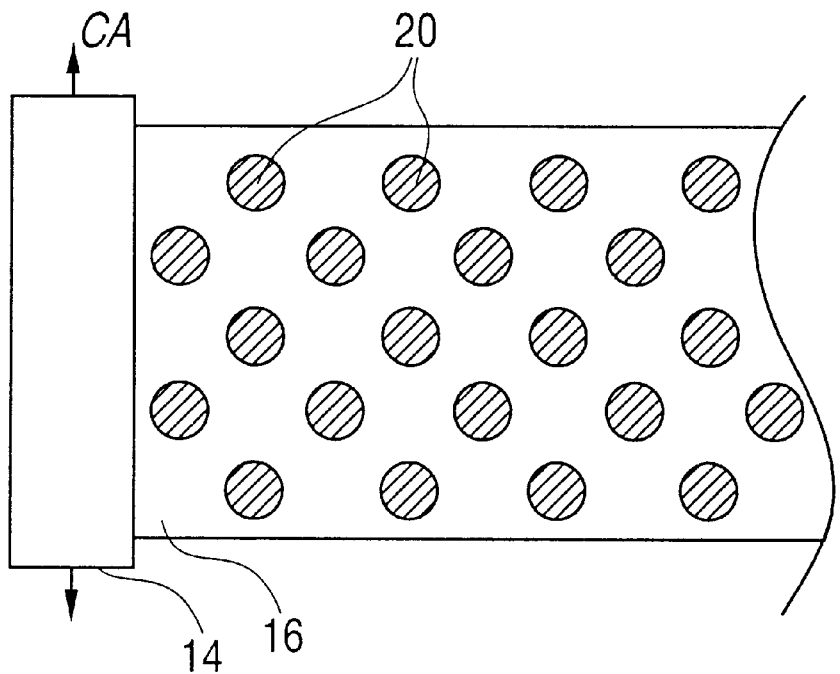
FIG. 3 is a topographical view of a filter sheet with a plurality of discrete heat generators in accordance with one embodiment of the present invention.
Figure 4:
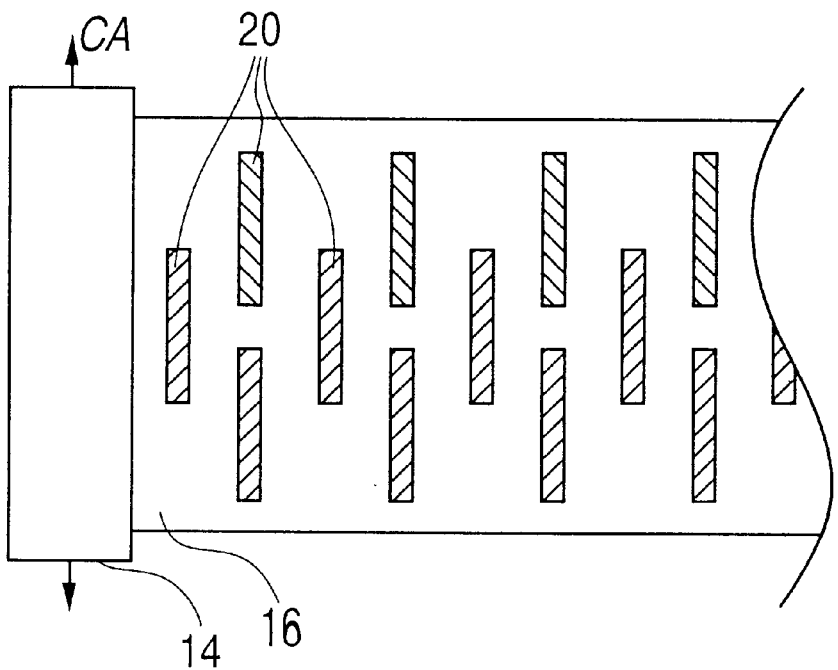
FIG. 4 is a topographical view of a filter sheet with a plurality of discrete heat generators in accordance with another embodiment of the present invention.

In accordance with the present invention, the filter element 10 also includes a plurality of discrete heat generators 20 (shown through the filter sheet 16 with broken lines) disposed in the filter media 12. FIGS. 3 and 4 each show different embodiments of the plurality of discrete heat generators 20 that may alternatively be provided on the filter sheet 16 so that when the filter sheet 16 is spirally wound, the plurality of discrete heat generators 20 are disposed between the plurality of wound filter layers. Each of the plurality of discrete heat generators 20 are adapted to absorb microwave energy and convert the microwave energy into heat. Thus, in contrast to the prior art filter elements in which the heating of the filter element is obtained by homogeneously distributed whiskers or by an evenly distributed coating on the filter element, the filter element 10 in accordance with the present invention has a plurality of discrete heat generators 20 disposed within the filter media 12 which are adapted to absorb the microwave energy and convert the microwave energy into heat so as to heat the surrounding filter media 12 and cause the regeneration of the filter element 10.

Preferably, to allow microwave energy to be transmitted to the plurality of discrete heat generators 20, the filter sheet 16 is made to absorb substantially less microwave energy than the plurality of discrete heat generators, and may in fact, be transparent to microwave energy. In this regard, the refractory filter sheet 16 and the corrugation sheet 18 may be made of ceramic fibers such as alumina fibers and/or alumina silicate fibers or other material which is substantially transparent to microwave energy. The plurality of discrete heat generators 20 may be made of a microwave energy absorbing material such as silicon carbide, ferrite and/or any other appropriate microwave responsive material that converts the microwave energy into heat.

In addition, as can be appreciated by examining FIGS. 3 and 4, the plurality of discrete heat generators 20 are arranged on the filter sheet 16 so that when the filter sheet 16 is spirally wound, the plurality of discrete heat generators 20 are arranged in a spatial array. In particular, as will be discussed in further detail below, because the filter media 12 in accordance with the present invention is regenerated by a plurality of discrete heat generators 20 instead of by a homogeneously distributed microwave responsive material, the plurality of discrete heat generators 20 may be provided in the filter media 12 in a spatial array that allows even heat distribution in the filter media 12 to allow even regeneration of the filter media 12. It should also be noted whereas in FIGS. 1 to 4, the plurality of discrete heat generators are provided on the filter sheet 16, it need not be so. In an alternative embodiment, the plurality of discrete heat generators 20 may be provided on the filter sheet 16 and/or the corrugation sheet 18. In fact, the corrugation sheet 18 may be made of the same material as the filter sheet 16 but further processed to have the corrugated shape. Moreover, in this regard, the plurality of discrete heat generators 20 may be provided on the refractory filter sheet 16 and/or the corrugation sheet 18 by laminating, embedding and/or printing.

Figure 2:
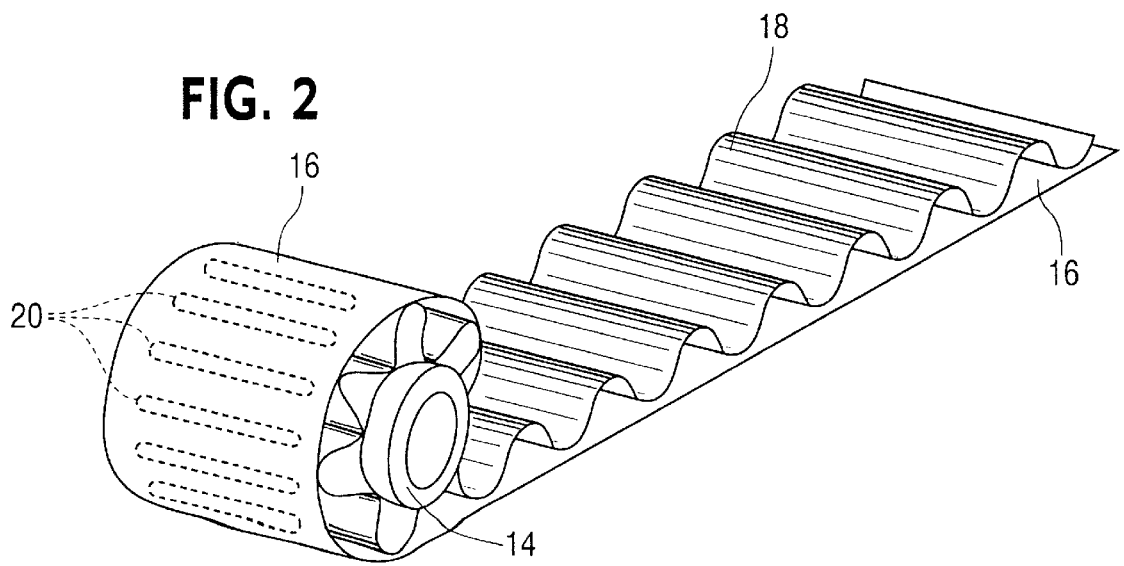
FIG. 2 is a partial assembly view of the filter element of FIG. 1.

As clearly illustrated, the plurality of discrete heat generators 20 in the embodiment of FIGS. 1 and 2 are made to have an elliptical shape while the plurality of discrete heat generators 20 in the embodiments of FIGS. 3 and 4 are made to have a circular and a rectangular shape. It should be appreciated however, that the plurality of discrete heat generators in accordance with the present invention may also have other shapes as well.

Figure 5A:
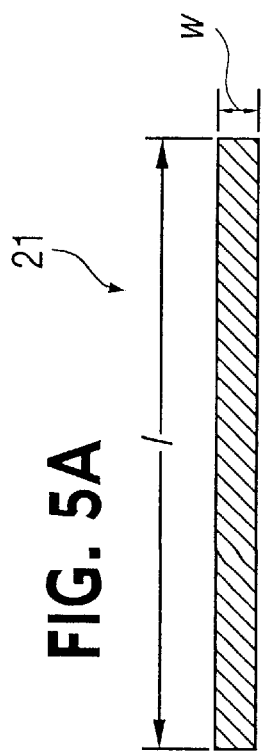
FIG. 5A is an enlarged view of a discrete heat element in accordance with one embodiment of the present invention.

FIGS. 5A to 6B each show the geometry of various preferred embodiments of a heat generator 21 which may be one of the plurality of discrete heat generators 20 provided in the filter media 12. As can be seen in FIG. 5A, the heat generator 21 may be substantially planar shaped having a length dimension l and a width dimension w which are substantially larger than a thickness dimension (not shown) which is perpendicular to the illustrated figure. The discrete heat generator 21 may be shaped as an elongated polygon in the manner shown and specifically dimensioned to act as an antenna to efficiently receive the microwave energy. In this regard, the length dimension l of the discrete heat generator 21 may be substantially ½ of a microwave wavelength. In applications using a commercially available 2.45 GHz microwaves, the length dimension l would be approximately 6.1 centimeters. In addition, the discrete heat generator 21 may also have a width dimension w of substantially ⅛ of a microwave wavelength. Again, in applications using a commercially available 2.45 GHz microwaves, the width dimension w would be approximately 1.5 centimeters.

Figure 6A:
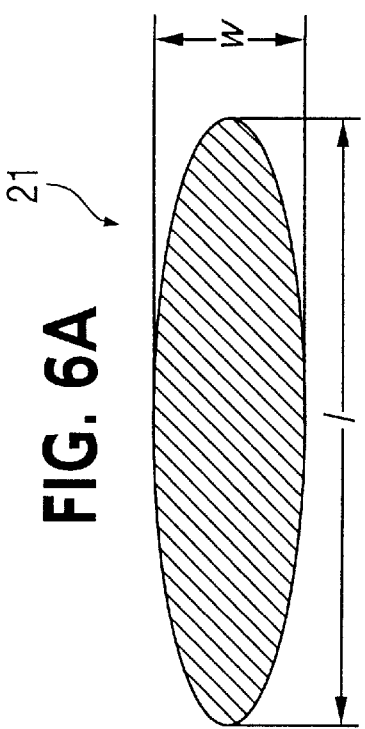
FIG. 6A is an enlarged view of a discrete heat element in accordance with another embodiment of the present invention.

FIG. 6A illustrates another preferred embodiment for the discrete heat generator 21 which has an elliptical geometry shown. Like the discrete heat generator of FIG. 5A, the elliptical discrete heat generator 21 may be specifically dimensioned to act as an antenna to efficiently receive the microwave energy and may have a length dimension l which is substantially ½ of a microwave wavelength and a width dimension w of substantially ⅛ of a microwave wavelength. Again, in applications using a commercially available 2.45 GHz microwaves, the length dimension l of the discrete heat generator 21 would be approximately 6.1 centimeters while the width dimension w would be approximately 1.5 centimeters. It has been found by the present inventors that the elliptical geometry of the discrete heat generator 21 shown in FIG. 6A minimizes the occurrence of highly localized heat gain that can occur in the elongated rectangular geometry of FIG. 5A which can cause material failure of the discrete heat generator. It has also been found that the elliptical geometry of the discrete heat generator 21 exhibited superior temperature uniformity than other geometries. Also, as previously noted, the discrete heat generator 21 may be provided on the refractory filter sheet 16 and/or the corrugation sheet 18 by laminating, embedding and/or printing and be made of silicon carbide, ferrite and/or other appropriate microwave responsive material.

Figure 5B:
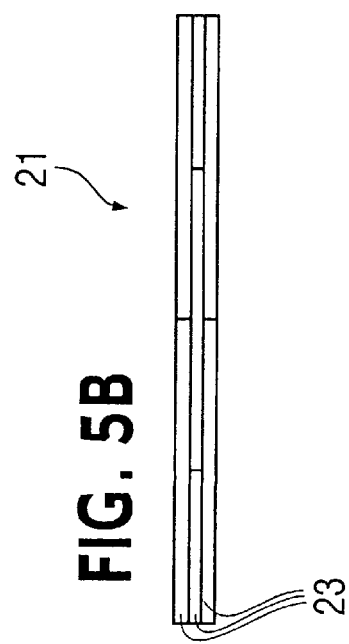
FIG. 5B illustrates a discrete heat element which is formed from a plurality of microwave absorption fibers.
Figure 6B:
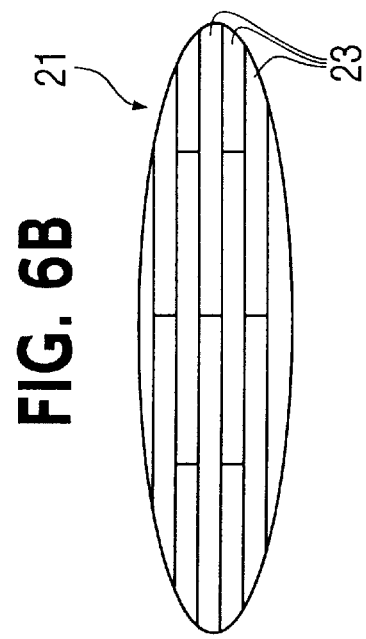
FIG. 6B illustrates a discrete heat element which is formed from a plurality of microwave absorption fibers.

Moreover, as shown in FIGS. 5B and 6B, the discrete heat generator 21 may also be formed from a plurality of microwave absorption fibers 23 that are attached together in the geometry desired. FIG. 5B illustrates a discrete heat generator 21 having an elongated polygonal geometry which is formed from a plurality of microwave absorption fibers 23. Likewise, FIG. 6B illustrates a discrete heat generator 21 having an elliptical geometry which is formed from a plurality of microwave absorption fibers 23 as well.

In accordance with yet other embodiments of the present invention as shown in FIGS. 7 and 8, the plurality of discrete heat generators 20 may be disposed in a spatial array in a manner to ensure even heating and regeneration of the filter media 12. In particular, the plurality of discrete heat generators 20 may be disposed in a spatial array on the filter sheet 16 and/or the corrugation sheet 18 in a manner that density of the plurality of discrete heat generators 20 varies radially away from a central axis CA of the filter element 10 of FIG. 1. As can be seen and appreciated in FIG. 7, the density of the plurality of discrete heat generators 20 decreases in the direction of arrow "d" such that when the filter sheet 16 (and/or the corrugation sheet 18) is spirally wound about the central axis CA to form the filter element 10 of FIG. 1, the density of the plurality of discrete heat generators 20 decreases radially away from a central axis CA of the filter element 10 (i.e. decreases in the direction of arrow "r" in FIG. 1). Of course, it should also be noted that in an alternative embodiment, plurality of discrete heat generators 20 may be disposed in a spatial array on the filter sheet 16 in a manner that the density of the plurality of discrete heat generators 20 increases in the direction of arrow "d" so that when the filter sheet 16 (and/or the corrugation sheet 18) is spirally wound about the central axis CA, the density of the plurality of discrete heat generators 20 increases radially away from a central axis CA of the filter element 10 (i.e. increases in the direction of arrow "r" in FIG. 1). By providing a plurality of discrete heat generators 20 instead of homogeneously distributed whiskers or a coating, the placement and density of the plurality of discrete heat generators 20 may be used to effectively control the heat distribution in the filter media 12. In this manner, the present invention provides even heating and regeneration of the filter media 12.

To further clarify the above discussed aspect of the present invention, FIG. 8 illustrates an alternative embodiment of the filter sheet 16 where the density of the plurality of discrete heat generators 20 in the spatial array varies radially away from the central axis CA of the filter element 10 and also varies axially along the central axis CA. In particular, as can be seen and appreciated in FIG. 8, the density of the plurality of discrete heat generators 20 decreases in the direction of arrow "d" such that when the filter sheet 16 (and/or the corrugation sheet 18) is spirally wound about the central axis CA to form the filter element 10 of FIG. 1, the density of the plurality of discrete heat generators 20 decreases radially away from a central axis CA of the filter element 10, i.e. decreases in the direction of arrow "r"). Moreover, the density of the plurality of discrete heat generators 20 also decreases in the direction of arrow "f" such that when the filter sheet 16 (and/or the corrugation sheet 18) is spirally wound about the central axis CA to form the filter element 10 of FIG. 1, the density of the plurality of discrete heat generators 20 decreases along the central axis CA of the filter element 10, i.e. decreases in the direction of arrow "f"). Of course, it should be noted that in an alternative embodiment, the density of the plurality of discrete heat generators 20 may instead increase in the direction of arrow "f" such that when the filter sheet 16 (and/or the corrugation sheet 18) is spirally wound about the central axis CA, the density of the plurality of discrete heat generators 20 increases along the central axis CA of the filter element 10, i.e. increases in the direction of arrow "f").

Therefore, as can be seen from the above discussion, in contrast to the embodiments of FIGS. 3 and 4 in which the density of the plurality of discrete heat generators 20 was constant throughout the filter media 12, the plurality of discrete heat generators 20 may be disposed in a spatial array in other embodiments of the filter sheet 16 and/or the corrugation sheet in a manner that density of the plurality of discrete heat generators 20 varies radially and/or axially along the central axis CA of the filter element 10. Moreover, as previously stated, by providing a plurality of discrete heat generators 20 instead of homogeneously distributed whiskers or a coating, the heat distribution in the filter media 12 can be effectively controlled by the selection of the placement and density of the plurality of discrete heat generators 20, both radially and axially along the central axis CA. In this manner, the present invention provides even heating and regeneration of the filter media 12 since the placement and heating characteristics of the microwave source can be compensated for by the placement and density of the plurality of discrete heat generators 20.

Thus, for instance, if the microwave source is provided radially surrounding the filter element 10, it may be desirable to have the density of the plurality of discrete heat generators 20 decrease radially away from a central axis CA of the filter element 10 in the manner shown in FIGS. 7 and/or 8 so that not all of the microwave is absorbed by the plurality of discrete heat generators positioned near the periphery of the filter media 12 and some of the microwave is allowed to pass to the central region of the filter media 12 to be absorbed by the plurality of discrete heat generators provided at that region. However, if the microwave source is provided within the mandrel 14, it may be desirable to have the density of the plurality of discrete heat generators 20 increase radially away from a central axis CA of the filter element 10 so that not all of the microwave is absorbed by the plurality of discrete heat generators along the central region of the filter media 12 and some of the microwave is allowed to pass to the periphery of the filter media 12 to be absorbed by the plurality of discrete heat generators provided at that region. In this manner, by providing a plurality of discrete heat generators 20, the heat distribution in the filter media 12 can be effectively controlled by the selection of the placement and density of the plurality of discrete heat generators 20, both radially and axially along the central axis CA.

Furthermore, it should also be appreciated that although in the illustrated embodiments of FIGS. 7 and 8, the placement and density of the plurality of discrete heat generators 20 are continuously varied radially and/or axially along the central axis CA of the filter element 10, it need not be so. Instead, the plurality of discrete heat generators 20 may be provided in numerous distinct regions so that each region of the filter element may have different placement and density of plurality of heat generators 20 than an adjacent region.

Figure 9:
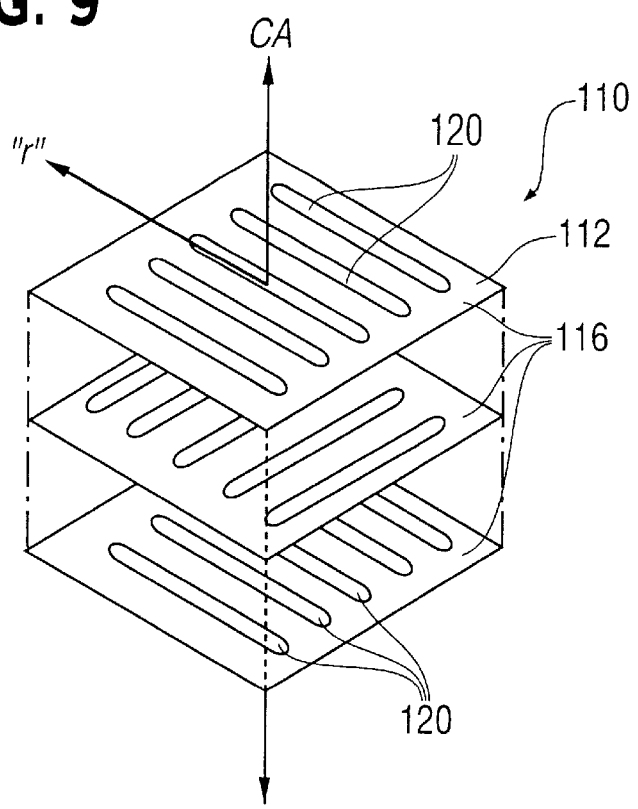
FIG. 9 is a perspective unassembled view of a filter element in accordance with another embodiment of the present invention wherein the filter media is made of plurality of stacked filter sheets.

In accordance with another embodiment of the present invention as illustrated in FIG. 9, the filter media 112 of the filter element 110 may be made of plurality of stacked filter sheets 116 instead of a spirally wound filter sheet as shown in FIG. 1. In accordance with the present invention, the plurality of stacked filter sheets 116 are provided with a plurality of discrete heat generators 120. Even though the plurality of stacked filter sheets 116 are polygonal in shape, they may still be considered to have a central axis CA and a radial direction "r" in the manner shown. Moreover, in another embodiment (not shown), the plurality of discrete heat generators 120 may be provided in a spatial array in each of the plurality of stacked filter sheets 116 a manner that density of the plurality of discrete heat generators 120 varies radially and/or axially along the central axis CA of the filter element 110 in a similar manner as described previously with respect to embodiments of FIGS. 7 and/or 8. Again, by providing a plurality of discrete heat generators 120, the heat distribution in the filter media 112 can be effectively controlled by the selection of the placement and density of the plurality of discrete heat generators 120, both radially and axially along the central axis CA.

Figure 10:
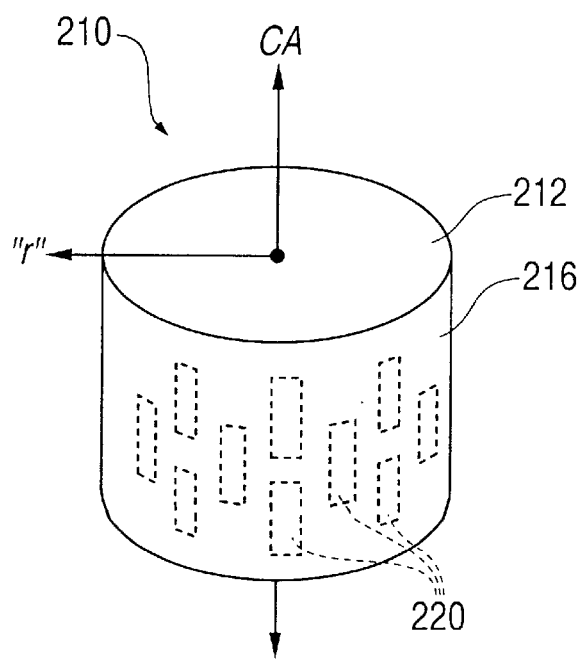
FIG. 10 is a perspective view of a filter element in accordance with yet another embodiment of the present invention wherein the filter element is a monolithic refractory filter element.

In accordance with yet another embodiment of the present invention as illustrated in FIG. 10, the filter media 216 of the filter element 212 may be a monolithic refractory filter made of a ceramic fiber which is substantially transparent to microwave energy. In accordance with the present invention, the filter media 216 also includes a plurality of discrete heat generators 220 (shown in broken lines) disposed within the monolithic refractory filter media 216. The ceramic fiber may be alumina or alumina silicate or other material that is substantially transparent to microwave energy. The plurality of discrete heat generators 220 are preferably disposed within the monolithic refractory filter media 216 in a spatial array and may be used to effectively control the heat distribution and regeneration of the filter media 216. This may be attained by the selection of the placement and density of the plurality of discrete heat generators 120, both radially and axially along the central axis CA in the manner previously discussed.

In view of the above, it is another aspect of the present invention to provide an improved method of manufacturing a microwave regenerable filter element. As can now be appreciated, the improved method includes the steps of providing a filter media for filtering particulates from an exhaust gas, and providing a plurality of discrete heat generators disposed in the filter media in a spatial array where each of the plurality of discrete heat generators are adapted to absorb microwave energy and convert the microwave energy into heat. To manufacture the preferred embodiment illustrated in FIGS. 1 and 2, the present method also includes the step of spirally winding a filter sheet 16 to form the filter media 12 having a plurality of wound filter layers. In addition, the preferred embodiment further includes the step of spirally winding a corrugation sheet 18 together with the filter sheet 16 to form a plurality of wound corrugation layers disposed between the plurality of wound filter layers. Preferably, the step of providing the plurality of discrete heat generators 20 may be attained by laminating, embedding or printing the plurality of discrete heat generators 20 on the filter sheet 16 and/or corrugation sheet 18.

In another embodiment of the present invention, the present method may also include the step of providing each of the plurality of discrete heat generators in a predetermined manner such that density of the plurality of discrete heat generators in the spatial array varies radially away from a central axis of the filter element. In this regard, each of the plurality of discrete heat generators may be provided in a predetermined manner such that density of the plurality of discrete heat generators in the spatial array increases radially away from the central axis of the filter element. Alternatively, each of the plurality of discrete heat generators may be provided in a predetermined manner such that the density of the plurality of discrete heat generators in the spatial array decreases radially away from the central axis of the filter element. Moreover, each of the plurality of discrete heat generators may be provided in a predetermined manner such that the density of the plurality of discrete heat generators in the spatial array varies axially along the central axis of the filter element.

From the foregoing, it should now be apparent how the present invention provides an improved microwave regenerable filter element which can be regenerated using microwave energy while avoiding the limitations of prior art filter and filter elements. In addition, it can be seen how the present invention may be used to allow even heat generation from the microwave energy, even at the portions of the filter element furthest away from the microwave source, to thereby allow full regeneration of the filter element. Furthermore, it can also now be appreciated how such a filter element may be provided in a very economical manner by the method in accordance with the present invention.

While various embodiments in accordance with the present invention have been shown and described, it is understood that the invention is not limited thereto. These embodiments may be changed, modified and further applied by those skilled in the art. Therefore, this invention is not limited to the details shown and described previously but also includes all such changes and modifications which are encompassed by the appended claims.

Industrial Applicability

The present invention will find applicability in a wide range of exhaust filtration devices in which regeneration of the filter element is desirable.

What is claimed is:

1. A microwave regenerable filter element comprising:
   a filter media for filtering particulates from an exhaust gas; and
   a plurality of discrete heat generators disposed in said filter media, each of said plurality of discrete heat generators being adapted to absorb microwave energy and convert the microwave energy into heat;
   wherein each of said plurality of discrete heat generators are substantially planar shaped having a length dimension and a width dimension which are substantially larger than a thickness dimension.

2. The filter element of claim 1, wherein said filter media includes a refractory filter sheet which absorbs substantially less microwave energy than said plurality of discrete heat generators.

3. The filter element of claim 2, wherein said filter sheet is spirally wound to form a plurality of wound filter layers.

4. The filter element of claim 3, wherein said plurality of discrete heat generators are disposed between said plurality of wound filter layers in a spatial array.

5. The filter element of claim 4, wherein said filter media includes a corrugation sheet which is spirally wound together with said filter sheet to form a plurality of wound corrugation layers disposed between said plurality of wound filter layers.

6. The filter element of claim 5, wherein said filter sheet and said corrugation sheet are wound around a centrally positioned mandrel.

7. The filter element of claim 2, wherein said refactory filter sheet is made of ceramic fibers.

8. The filter element of claim 7, wherein said ceramic fibers is at least one of alumina fibers and alumina silicate fibers.

9. The filter element of claim 5, wherein said corrugation sheet is made of ceramic fibers.

10. The filter element of claim 9, wherein said ceramic fibers is at least one of alumina fibers and alumina silicate fibers.

11. The filter element of claim 2, wherein said discrete heat generators are provided on said refractory filter sheet by at least one of laminating, embedding and printing.

12. The filter element of claim 4, wherein said plurality of discrete heat generators are provided on at least one of said filter sheet and corrugation sheet.

13. The filter element of claim 12, wherein said plurality of discrete heat generators are provided on said at least one of said filter sheet and corrugation sheet by at least one of lamination, embedding and printing.

14. The filter element of claim 1, wherein each of said plurality of discrete heat generators are shaped as at least one of a polygon, a circle and an ellipse.

15. A microwave regenerable filter element comprising:
   a filter media for filtering particulates from an exhaust gas; and
   a plurality of discrete heat generators disposed in said filter media, each of said plurality of discrete heat generators being adapted to absorb microwave energy and convert the microwave energy into heat;
   wherein said plurality of discrete heat generators are disposed in a spatial array in a manner that density of said plurality of discrete heat generators varies radially away from a central axis of said filter element.

16. The filter element of claim 15, wherein said filter media is a monolithic refractory filter made of a ceramic fiber which is substantially transparent to microwave energy and said plurality of discrete heat generators are disposed in said monolithic refractory filter.

17. The filter element of claim 16, wherein said ceramic fiber is at least one of alumina and alumina silicate.

18. The filter element of claim 16, wherein said plurality of discrete heat generators are disposed in said monolithic filter material in a spatial array.

19. The filter element of claim 15, wherein density of said plurality of discrete heat generators in said spatial array increases radially away from said central axis of said filter element.

20. The filter element of claim 15, wherein density of said plurality of discrete heat generators in said spatial array decreases radially away from said central axis of said filter element.

21. The filter element of claim 15, wherein density of said plurality of discrete heat generators in said spatial array also varies axially along said central axis of said filter element.

22. A microwave regenerable filter element comprising:
   a filter media for filtering particulates from an exhaust gas; and
   a plurality of discrete heat generators disposed in said filter media, each of said plurality of discrete heat generators being adapted to absorb microwave energy and convert the microwave energy into heat;
   wherein each of said plurality of discrete heat generators have a length dimension of substantially ½ of a microwave wavelength.

23. The filter element of claim 22, wherein said length dimension is approximately 6.1 centimeters.

24. A microwave regenerable filter element comprising:
   a filter media for filtering particulates from an exhaust gas; and
   a plurality of discrete heat generators disposed in said filter media, each of said plurality of discrete heat generators being adapted to absorb microwave energy and convert the microwave energy into heat;
   wherein each of said plurality of discrete heat generators have a width dimension of substantially ⅛ of a microwave wavelength.

25. The filter element of claim 24, wherein said width dimension is approximately 1.5 centimeters.

26. A microwave regenerable filter element comprising:
   a filter media for filtering particulates from an exhaust gas; and
   a plurality of discrete heat generators disposed in said filter media, each of said plurality of discrete heat generators being adapted to absorb microwave energy and convert the microwave energy into heat;
   wherein each of said plurality of discrete heat generators are comprised of a plurality of microwave absorption fibers attached together to form each of said plurality of discrete heat generators;
   wherein each of said plurality of microwave absorption fibers are bundled in a substantially planar shape that has a length dimension and a width dimension which are substantially larger than a thickness dimension.

27. A microwave regenerable filter element comprising:
   a filter media for filtering particulates from an exhaust gas; and
   a plurality of discrete heat generators disposed in said filter media, each of said plurality of discrete heat generators being adapted to absorb microwave energy and convert the microwave energy into heat;
   wherein said plurality of discrete heat generators are disposed in a spatial array in a manner that density of said plurality of discrete heat generators varies axially along a central axis of said filter element.

28. A method of manufacturing a microwave regenerable filter element comprising the steps of:
   providing a filter media for filtering particulates from an exhaust gas; and
   providing a plurality of discrete heat generators disposed in said filter media in a spatial array, each of said plurality of discrete heat generators being adapted to absorb microwave energy and convert the microwave energy into heat;
   wherein said plurality of discrete heat generators are substantially planar shaped having a length dimension and a width dimension which are substantially larger than a thickness dimension.

29. The method of claim 28, wherein said step of providing said plurality of discrete heat generators is attained by at least one of laminating, embedding and printing said plurality of discrete heat generators on said filter media.

30. The method of claim 28, further comprising the step of spirally winding a filter sheet to form said filter media having a plurality of wound filter layers.

31. The method of claim 30, further comprising the step of spirally winding a corrugation sheet together with said filter sheet to form a plurality of wound corrugation layers disposed between said plurality of wound filter layers.

32. The method of claim 31, wherein said step of providing said plurality of discrete heat generators is attained by at least one of laminating, embedding and printing said plurality of discrete heat generators on at least one of said filter sheet and corrugation sheet.

33. A method of manufacturing a microwave regenerable filter element comprising the steps of:

provinding a filter media for filtering particulates from an exhaust gas;

providing a plurality of discrete heat generators disposed in said filter media in a spatial array, each of said plurality of discrete heat generators being adapted to absorb microwave energy and convert the microwave energy into heat; and providing each of said plurality of discrete heat generators in a predetermined manner such that density of said plurality of discrete heat generators in said spatial array varies radially away from a central axis of said filter element.

34. The method of claim 33, wherein density of said plurality of discrete heat generators in said spatial array increases radially away from said central axis of said filter element.

35. The method of claim 33, wherein density of said plurality of discrete heat generators in said spatial array decreases radially away from said central axis of said filter element.

36. The method of claim 33, wherein density of said plurality of discrete heat generators in said spatial array also varies axially along said central axis of said filter element.

37. A method of manufacturing a microwave regenerable filter element comprising the steps of:

providing a filter media for filtering particulates from an exhaust gas;

providing a plurality of discrete heat generators disposed in said filter media in a spatial array, each of said plurality of discrete heat generators being adapted to absorb microwave energy and convert the microwave energy into heat; and providing each of said plurality of discrete heat generators in a predetermined manner such that density of said plurality of discrete heat generators in said spatial array varies axially along a central axis of said filter element.

* * * * *